Figure 1:
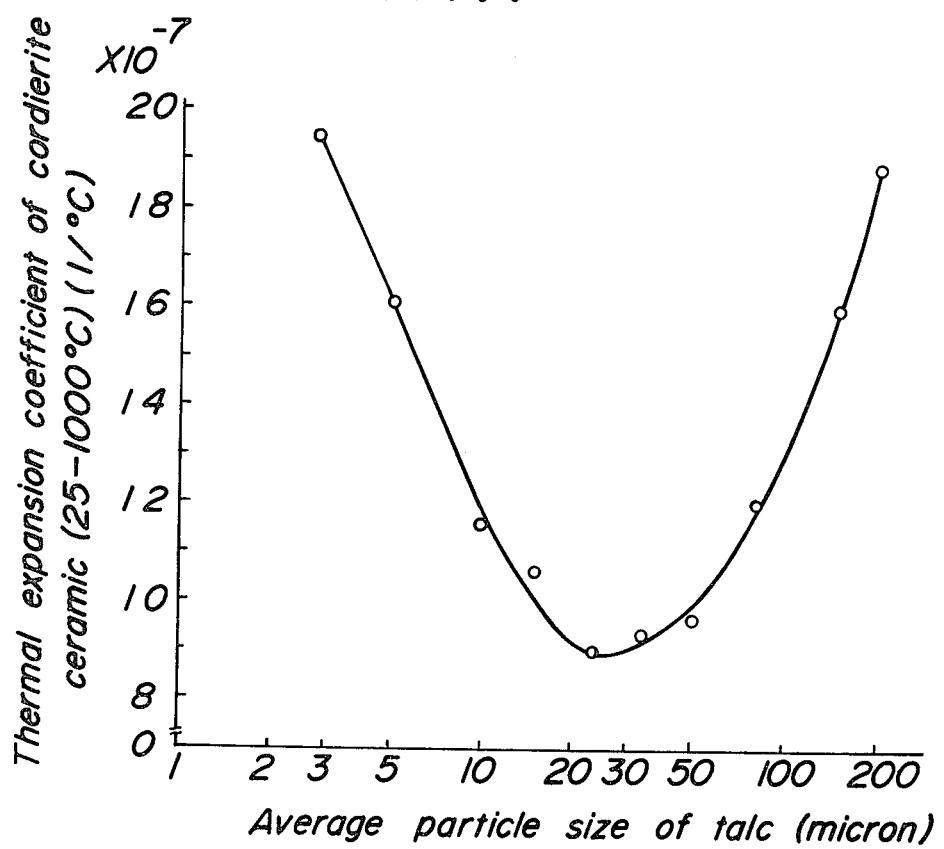

United States Patent [19]

Matsuhisa et al.

[11] 4,280,845

[45] Jul. 28, 1981

[54] CORDIERITE CERAMIC

[75] Inventors: Tadaaki Matsuhisa; Shigeo Soejima, both of Nagoya, Japan

[73] Assignee: NGK Insulators, Ltd., Japan

[21] Appl. No.: 107,701

[22] Filed: Dec. 27, 1979

Related U.S. Application Data

[63] Continuation of Ser. No. 936,197, Aug. 24, 1978, abandoned, which is a continuation of Ser. No. 777,575, Mar. 15, 1977, abandoned.

[30] Foreign Application Priority Data

Dec. 28, 1976 [JP] Japan ................................. 51-159157

[51] Int. Cl.$^3$ ....................... C04B 35/18; C04B 35/20
[52] U.S. Cl. .................................... 106/62; 106/73.4; 106/45; 264/66
[58] Field of Search .................... 106/62, 73.4; 264/66

[56] References Cited

U.S. PATENT DOCUMENTS

| | | | |
|---|---|---|---|
| 3,458,329 | 7/1969 | Owens et al. ........................ | 106/62 X |
| 3,531,307 | 9/1970 | Rubin et al. ............................ | 106/62 |
| 3,846,098 | 11/1974 | Nakashima et al. ................... | 106/45 |
| 3,885,977 | 5/1975 | Lachman et al. ....................... | 106/62 |
| 3,950,175 | 4/1976 | Lachman et al. ................... | 106/62 X |
| 3,954,672 | 5/1976 | Somers et al. ...................... | 106/62 X |
| 3,958,058 | 5/1976 | Elmer .............................. | 106/40 R X |
| 3,979,216 | 9/1976 | Fritsch et al. ........................... | 106/62 |
| 4,001,028 | 1/1977 | Frost et al. ............................. | 106/62 |
| 4,033,779 | 7/1977 | Winkler .................................. | 106/62 |

*Primary Examiner*—Helen M. McCarthy
*Attorney, Agent, or Firm*—Stevens, Davis, Miller & Mosher

[57] ABSTRACT

Cordierite ceramic consisting mainly of cordierite in crystal phase after fired and having a mean pore size of 2-50 microns and a thermal expansion coefficient of not more than $16 \times 10^{-7}$ (1/° C.) over the range of 25-1000° C. and being produced by starting from a batch including a magnesia raw material with an average particle size of 5-150 microns.

5 Claims, 3 Drawing Figures

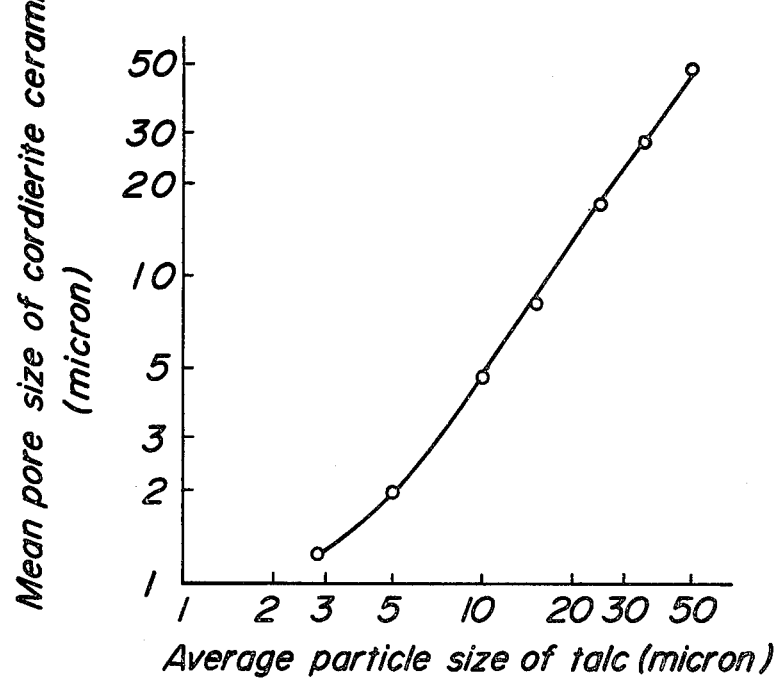

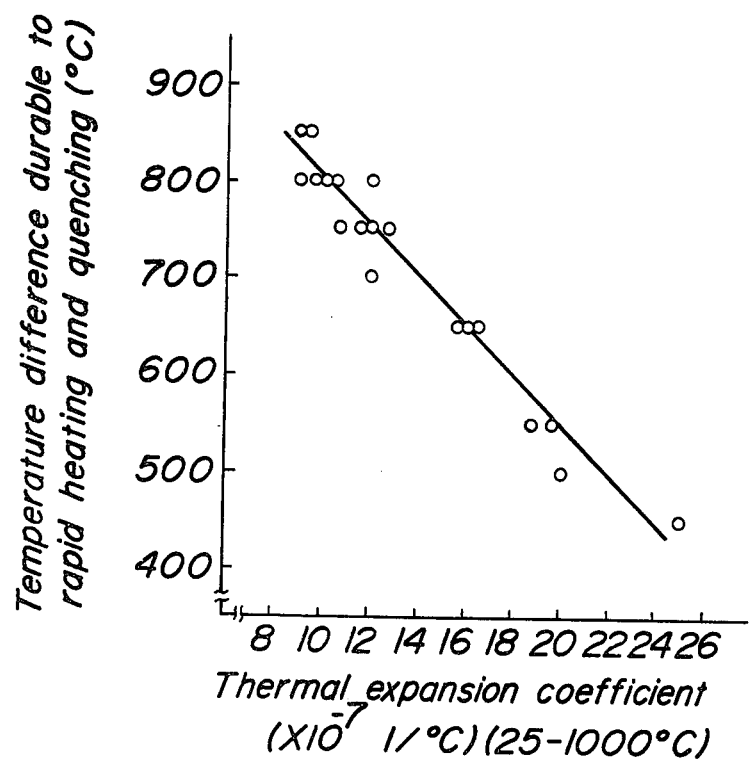

CORDIERITE CERAMIC

This is a continuation of application Ser. No. 936,197 filed Aug. 24, 1978, now abandoned, which in turn is a Rule 60 continuation of Ser. No. 777,575, filed Mar. 15, 1977, now abandoned.

The present invention relates to cordierite ceramic and more particularly to low-expansive and porous coriderite ceramic having excellent thermal shock resistance, thermal resistance and catalyst adhering ability, which is suitably adapted for a catalyst support having an excellent catalytic activity and resistance to catalyst poison.

A mean pore size which is a property relating to the pore of the porous ceramic is defined as a pore diameter corresponding to 50% of the total pore volume having the pore diameter of 100 Å–100μ in the pore size distribution according to a mercury pressure porosimeter.

The porous cordierite ceramic having an excellent thermal shock resistance is particularly watched as a honeycomb catalyst substrate to be used in an apparatus for purifying hydrocarbons, carbon monoxide and nitrogen oxides in various exhaust gases. The ceramic honeycomb catalyst substrate to be used in various exhaust gas purifying apparatuses, particularly the apparatus for purifying automotive exhaust gas requires several important properties. One of these properties is a thermal shock resistance, which means that no crack or rupture is caused by thermal stress induced by a large temperature difference which occurs in the ceramic honeycomb subjected to the temperature change due to rapid heat generation in a catalytic oxidation reaction of unburnt hydrocarbons and carbon monoxide in the exhaust gas. This thermal shock resistance is indicated by a temperature difference durable to rapid heating and quenching (hereinafter referred to as durable temperature difference). The durable temperature difference is known to be inversely proportional to thermal expansion coefficient among the properties of the ceramic honeycomb and becomes larger as the thermal expansion coefficient is small.

Another property required for the ceramic honeycomb catalyst substrate is an adhering ability with an active material for catalyst and a catalytic component, which means an adhering and supporting ability upon coating the active material and the catalytic component on the honeycomb catalyst substrate and an adhering and holding ability of the active material and the catalytic component on the honeycomb catalyst substrate by which the coatings are not exfoliated upon driving.

A further property required for the ceramic honeycomb catalyst substrate is an initial activity of the catalytic component and a resistance to catalyst poison when used as a catalyst support. The term "resistance to catalyst poison" used herein means a property withstanding a loss of catalytic action caused by clogging pores of the catalytic surface with unburnt hydrocarbons, lubricating oil additives, compounds of phosphorus, lead and the like as inclusions, and combustion product of sulfur in the exhaust gas. Though a relationship between the pore structure of the ceramic honeycomb catalyst substrate and the activity of the honeycomb catalyst is not sufficiently clear, it is considered that the resistance to catalyst poison is related to the size distribution of pores having a large pore diameter.

A still further properties required for the ceramic honeycomb catalyst substrate is a thermal resistance, which does not cause local fusing or softening deformation due to rapid temperature rise caused by oxidation reaction when a raw gas produced by misfire of automotive engine is introduced into the honeycomb catalyst. This thermal resistance is generally indicated by the softening temperature, fusing temperature and softening shrinkage at 1450° C. The higher the softening and fusing temperature and the smaller the softening shrinkage at 1450° C., the higher the thermal resistance. Usually, automobiles provided with the catalytic purifying apparatus are provided with various safety devices such as a secondary air controlling mechanism for suppressing the misfire and the like, so that unless the fusing temperature of the ceramic honeycomb catalyst substrate is more than 1460° C., there is no practical problem.

It has been well-known that the cordierite ceramic exhibits a low thermal expansion. For instance, the anisotropic cordierite ceramic having a thermal expansion coefficient in at least one direction of $11 \times 10^{-7}$ in/in/°C. over the range of 25°–1000° C. is disclosed in Irwin M. Lachman et al, U.S. Pat. No. 3,885,977 issued May 27, 1975 and entitled "Anisotropic Cordierite Monolith". Further, there is disclosed in this patent that such anisotropy results from a plane orientation caused by clay platelets and clay stacks. However, this patent does not disclose the magnesia raw material to be used in the present invention and its particle size at all and further there is no description with respect to the pore diameter.

Furthermore, the ceramic article consisting essentially of cordierite and 1–5% of a magnesium aluminum titanate phase and having a thermal expansion coefficient of less than $1.8 \times 10^{-6}$/°C. within the range of 25° C. to 700° C. is disclosed in Jack Alvin Rubin et al, U.S. Pat. No. 3,531,307 issued Sept. 29, 1970 and entitled "Ceramic Article And Method For Producing Same". Moreoover, the ultra-low expansion ceramic article obtained by selectively removing alumina and magnesia from thin-walled polycrystalline cordierite ceramic and having a thermal expansion coefficient of less than $5.4 \times 10^{-7}$/°C. over the range from room temperature to 1000° C. is disclosed in Thomas H. Elmer, U.S. Pat. No. 3,958,058 issued May 18, 1976 and entitled "Ultra-low Expansion Ceramic Articles". However, these patents are not included in the present invention.

Further, the porous cordierite ceramic having at least 20% of open pores larger than 10 microns in diameter, which is obtained by replacing a portion or the entire quantity of the talc or clay raw material with silica-alumina raw material such as pyrophillite, kyanite, quartz and fused silica, is disclosed in Irwin M. Lachman, et al, U.S. Pat. No. 3,950,175 issued Apr. 13, 1976 and entitled "Pore Size Control In Cordierite Ceramic". However, the thermal expansion of the cordierite ceramic becomes large and hence the thermal shock resistance is deteriorated when pyrophillite, kyanite, quartz or fused silica is substituted for all or a portion of the talc or clay. Therefore, the thermal expansion is sacrificed in the ceramic article disclosed in this patent. Furthermore, there is not described at all that the low thermal expansion and the control of pore diameter are accomplished by the particle size of the magnesia raw material according to the present invention.

The ceramic honeycomb catalyst substrate to be used in the apparatus for purifying automotive exhaust gas is very severe in the using condition and it is strongly demanded to develop the ceramic honeycomb having excellent thermal resistance, thermal shock resistance, adhering ability with active material for catalyst and catalytic component, initial catalytic activity and resistance to catalyst poison.

The present invention is based on the discovery that the cordierite ceramic having a thermal expansion coefficient satisfactory for practical use is obtained when the average particle size of magnesia raw material such as talc, calcined talc, magnesium carbonate, magnesium hydroxide, magnesium oxide and the like is within a range of 5–150 microns because the particle size of the magnesia raw material exerts upon the thermal expansion of the cordierite ceramic after fired and the larger the particle size of the magnesia raw material, the lower the thermal expansion coefficient of the cordierite ceramic. Furthermore, in the present invention, it has been found out that the particle size of the magnesia raw material is related to the pore diameter of the cordierite ceramic after fired and the larger the particle size, the larger the pore diameter.

Moreover, the present invention is based on the discovery that by selecting a chemical composition of 42–52% by weight of silica, 34–48% by weight of alumina and 10–18% by weight of magnesia, preferably 44–51% by weight of silica, 35–45% by weight of alumina and 11–16% by weight of magnesia, a ceramic honeycomb consisting mainly of cordierite in the crystal phase and containing not more than 35% by weight, preferably not more than 30% by weight, more preferably 1–25% by weight of at least one crystal selected from the group consisting of spinel, sapphirine, mullite and corundum can be obtained and is higher in the softening and fusing temperatures than the ceramic honeycomb consisting of cordierite alone and slow in gradient of softening shrinkage curve from the softening temperature to the fusing temperature and the thermal resistance is improved, further that the ceramic honeycomb has substantially no difference in the thermal expansion coefficient from the ceramic honeycomb consisting of cordierite alone and is high in the thermal shock resistance. Further, it has been found out that the adhering ability, catalytic activity and resistance to catalyst poison are closely related to the pore structure of the ceramic honeycomb catalyst substrate, i.e. the catalytic activity is governed by the pore volume having the pore diameter of 2–5 microns in the honeycomb catalyst substrate and becomes higher with the increase of this pore volume having the pore diameter of 2–5 microns and also the adhering ability and resistance to catalyst poison are improved by increasing the pore volume having the pore diameter of more than 5 microns on the surface of the catalyst substrate.

It is, therefore, a main object of the present invention to provide cordierite ceramic having excellent thermal shock resistance, adhering ability with active material for catalyst and catalytic component on a catalyst substrate, catalytic activity and resistance to catalyst poison.

Another object of the present invention is to provide cordierite ceramic, in which the excellent thermal shock resistance of cordierite is maintained and the thermal resistance of a defect of cordierite is improved.

The cordierite ceramic according to the present invention consists mainly of cordierite in crystal phase after fired, which is produced by starting from a batch including a magnesia raw material with an average particle size of 5–150 microns, and has a mean pore size of 2–50 microns and a thermal expansion coefficient of not more than $16 \times 10^{-7}$ (1/°C.) over the range of 25°–1000° C. Preferably, the cordierite ceramic according to the present invention is produced by starting from a batch having a chemical composition of 42–52% by weight of silica, 34–48% by weight of alumina and 10–18% by weight of magnesia, preferably 44–51% by weight of silica, 35–45% by weight of alumina and 11–16% by weight of magnesia, said batch including a magnesia raw material with an average particle size of 5–150 microns, preferably 21–100 microns, more preferably 26–80 microns, and consists mainly of cordierite in the crystal phase after fired and contains not more than 35% by weight, preferably not more than 30% by weight, more preferably 1–25% by weight of at least one crystal selected from the group consisting of spinel, sapphirine, mullite and corundum, and has a mean pore size of 2–50 microns and a thermal expansion coefficient of not more than $16 \times 10^{-7}$ (1/°C.) over the range of 25°–1000° C.

The invention will now be described in greater detail with reference to the accompanying drawings, wherein:

FIG. 1 is a graph showing a relation between the average particle size of talc as the magnesia raw material and the thermal expansion coefficient over the range of 25°–1000° C. in the cordierite ceramic obtained by firing at 1380° C. for 5 hours (the temperature rising rate above 1100° C. is 200° C./hr);

FIG. 2 is a graph showing a relation between the average particle size of talc as the magnesia raw material and the mean pore size of the cordierite ceramic obtained by firing at 1380° C. for 5 hours (the temperature rising rate above 1100° C. is 200° C./hr); and FIG. 3 is a graph showing a relation between the thermal expansion coefficient over the range of 25°–1000° C. in the cordierite ceramic and the temperature difference durable to rapid heating and quenching of the ceramic honeycomb with a size of 5"ϕ×3"L) (127 mmϕ×76.2 mmL).

The method of producing cordierite ceramic according to the present invention will be described below.

The cordierite ceramic is produced by mixing at least one magnesia raw material having an average particle size of 5–150 microns such as talc, calcined talc, magnesium carbonate, magnesium hydroxide, magnesium oxide and the like with a raw material selected from aluminum hydroxide, alumina, kaolin, calcined kaolin and amorphous silica and other necessary additives to prepare a plasticizable batch having a chemical composition of 42–52% by weight of silica, 34–48% by weight of alumina and 10–18% by weight of magnesia, preferably 44–51% by weight of silica, 35–45% by weight of alumina and 11–16% by weight of magnesia. Then, the batch is plasticized and formed into a honeycomb shape in the usual ceramic fabricating method, for example, by extruding, pressing, rolling or the like and then dried. Next, the dried honeycomb is heated up to 1100° C. at a rate of not more than 250° C./hr and further up to a firing temperature above 1100° C. at a rate of 30°–300° C./hr and then fired at the firing retention temperature of 1300°–1400° C. for a time of 0.5–24 hours, whereby the cordierite ceramic according to the present invention is obtained.

As mentioned above, the cordierite ceramic according to the present invention exhibits low thermal expansion and has a satisfactory pore structure required for the adhering ability, catalytic activity and resistance to catalyst poison by limiting the particle size of the magnesia raw material to the range of 5–150 microns and preferably controlling the firing conditions. Especially, it should be noted that a liquid phase is produced at a temperature of about 1280° C. to 1350° C. during firing and has a great influence on the yield and pore structure of the resulting cordierite ceramic. Furthermore, it has been found that this liquid phase considerably affects the particle size of the magnesia raw material and the firing conditions. That is, when the particle size of the magnesia raw material is large and the temperature rising rate during firing is fast, the liquid phase is liable to be produced and diffuses into a solid phase to effect the formation of cordierite. As a result, the liquid phase portions are changed into pores, so that the pores having a large pore diameter are liable to be formed and the formation of cordierite sufficiently proceeds to achieve low thermal expansion. On the contrary, when the particle size of the magnesia raw material is small and the temperature rising rate is slow, the liquid phase produced at an interface between the magnesia raw material and the silica-alumina raw material reacts with a solid phase to form cordierite at a liquid/solid interface and as a result, the resulting cordierite inhibits subsequent formation of the liquid phase. Consequently, the viscosity of the liquid phase becomes higher as compared with the case of the magnesia raw material having the large particle size, so that not only formation of pores having a large pore diameter is impeded, but also the formation of cordierite insufficiently proceeds and low thermal expansion is not achieved. Moreover, a certain firing temperature is required for sufficiently causing the formation of liquid phase and diffusing the liquid phase into a solid phase to form cordierite and also a certain firing retention time is required for sufficiently promoting the formation of cordierite.

The reason of the above described limitations in the present invention is as follows.

The reason why the average particle size of the magnesia raw material is limited to 5-150 microns is based on the fact that when the average particle size is beyond the above range, the thermal expansion coefficient over the range of 25°-1000° C. in the cordierite ceramic is more than $16 \times 10^{-7}$ (1/°C.) as seen from FIG. 1 and the durable temperature difference as an indication of thermal shock resistance does not reach 650° C. as seen from FIG. 3, so that when the resulting cordierite ceramic is used as a honeycomb catalyst substrate for an exhaust gas purifying apparatus for a long time, crack or rupture is caused in the catalyst substrate. Furthermore, when the average particle size is less than 5 microns, the mean pore size of the resulting low-expansive and porous cordierite ceramic is less than 2 microns as seen from FIG. 2 and the adhering ability of the active material for catalyst and the catalytic component on the cordierite ceramic honeycomb catalyst substrate is deteriorated. Therefore, when such a ceramic honeycomb is used as the apparatus for purifying the exhaust gas, the supported active material and catalytic component are apt to be exfoliated by mechanical vibration, thermal shock and the like and also the pores of the catalytic surface are apt to be clogged by unburnt hydrocarbons, lubricating oil additives, compounds of phosphorus, lead and the like as inclusions and combustion product of sulfur in the exhaust gas and hence the resistance to catalyst poison lowers.

The average particle size of the magnesia raw material is preferably within a range of 21-100 microns, particularly 26-80 microns. In such a preferred range, the thermal expansion is further lowered and the thermal shock resistance, adhering ability of active material for catalyst and catalytic component on cordierite ceramic honeycomb catalyst substrate, catalytic activity and resistance to catalyst poison are further improved.

The reason why the mean pore size of the cordierite ceramic is limited to 2-50 microns is based on the fact that when the mean pore size is within the above range, the adhering ability of the active material and the catalytic component on the catalyst substrate, catalytic activity and resistance to catalyst poison are excellent. When the mean pore size is less than 2 microns, the adhering ability and resistance to catalyst poison are poor, while when the mean pore size is more than 50 microns, the mechanical strength of the low-expansive and porous cordierite ceramic honeycomb strucutre lowers and the specific surface area of the pore surface considerably lowers and the catalytic activity also lowers.

The reason why the chemical composition range is limited to 42-52% by weight of silica, 34-48% by weight of alumina and 10-18% by weight of magnesia is based on the fact that when the chemical composition is within the above range, the thermal expansion coefficient over the range of 25°-1000° C. in the cordierite ceramic is not more than $16 \times 10^{-7}$ (1/°C.) and the thermal shock resistance is excellent and further this composition range can provide such a crystal phase that the main component consists of cordierite and not more than 35% by weight of at least one crystal of spinel, sapphirine, mullite and corundum which can improve the thermal resistance is contained.

The invention will be further explained in detail in the following examples which are not intended as limitation thereof.

EXAMPLE

Talc, calcined talc, magnesium hydroxide, magnesium carbonate, aluminum hydroxide, aluminum oxide, kaolin, calcined kaolin and amorphous silica, particle sizes of which were previously regulated, were compounded so as to obtain the chemical composition as shown in the Table 1. Then, the resulting mixture was added with 5-10 parts by weight of water and 20 parts by weight of starch paste (water content: 80%) based on 100 parts by weight of the mixture, thoroughly kneaded by a kneader and thereafter extruded into a honeycombed shape by a vacuum extruder. The formed body was dried and then fired under the firing conditions described in Table 1 to obtain cordierite ceramic honeycombs of Examples 1-16 and References 1-4.

The quantitative determination of spinel, sapphirine, mullite and corundum by powder X-ray diffraction, the thermal expansion coefficient over the range of 25°-1000° C., the temperature difference of the honeycomb with a size of 5"φ × 3"L (127 mmφ × 76.2 mmL) durable to rapid heating and quenching, the total pore volume and mean pore size (pore diameter corresponding to 50% of the total pore volume in the pore size distribution) of the thin-walled ceramic honeycomb portion according to the mercury pressure porosimeter and the fusing temperature were measured with respect to the various cordierite ceramic honeycombs shown in Table 1. The obtained results are also shown in Table 1.

TABLE 1

| | Present Invention | | | | | | | | | |
|---|---|---|---|---|---|---|---|---|---|---|
| | 1 | 2 | 3 | 4 | 5 | 6 | 7 | 8 | 9 | 10 |
| Chemical composition (wt. %) | | | | | | | | | | |
| $SiO_2$ | 51.5 | 51.0 | 51.0 | 51.0 | 51.0 | 51.0 | 51.0 | 51.0 | 51.0 | 49.5 |
| $Al_2O_3$ | 35.5 | 35.5 | 35.5 | 35.5 | 35.5 | 35.5 | 35.5 | 35.5 | 35.5 | 35.5 |
| MgO | 13.5 | 13.5 | 13.5 | 13.5 | 13.5 | 13.5 | 13.5 | 13.5 | 13.5 | 15.0 |
| compounding recipe, wt. % (Average particle size, μ) | | | | | | | | | | |
| Talc | 40 (5.1) | 40 (10) | 40 (15) | 40 (24) | 40 (34) | 40 | 40 (80) | 40 (150) | — | — |
| Calcined talc | — | — | — | — | — | — | — | — | — | — |
| Magnesium hydroxide | — | — | — | — | — | — | — | — | — | 18 (27) |
| Magnesium carbonate | — | — | — | — | — | — | — | — | 22 (20) | — |
| Magnesium oxide | — | — | — | — | — | — | — | — | — | — |
| Aluminum hydroxide | — | — | — | — | — | — | — | — | 38 (0.5) | 41 (0.5) |
| Aluminum oxide | 14 (3.0) | 14 (3.0) | 14 (3.0) | 14 (3.0) | 14 (3.0) | 14 (3.0) | 14 (3.0) | 14 (3.0) | — | — |
| Kaolin | 15 (1.5) | 15 (1.5) | 15 (1.5) | 15 (1.5) | 15 (1.5) | 15 (1.5) | 15 (1.5) | 15 (1.5) | — | — |
| Calcined kaolin | 31 (5.1) | 31 (5.1) | 31 (5.1) | 31 (5.1) | 31 (5.1) | 31 (5.1) | 31 (5.1) | 31 (5.1) | — | — |
| Amorphous silica | — | — | — | — | — | — | — | — | 40 (0.7) | 41 (0.7) |
| Firing condition | | | | | | | | | | |
| Temperature rising rate above 1100° C. °C./hr | 200 | 200 | 200 | 200 | 200 | 200 | 200 | 200 | 100 | 200 |
| Firing temperature × Retention time, °C. × hr | 1380 × 5 | 1380 × 5 | 1380 × 5 | 1380 × 5 | 1380 × 5 | 1380 × 5 | 1380 × 5 | 1380 × 5 | 1400 × 5 | 1350 × 5 |
| Properties of cordierite ceramic | | | | | | | | | | |
| Content of crystal phase (wt. %) | | | | | | | | | | |
| Spinel | 2 | 1.5 | 1 | 1 | 1 | 1 | 1 | 1.5 | 2 | 2 |
| Sapphirine | 1 | 1 | 1 | 0.5 | 0.5 | 1 | 0.5 | 0.5 | — | 1 |
| Mullite | 1.5 | 1.5 | 1 | 1 | 0.5 | 0.5 | 0.5 | 0.5 | 1 | 1 |
| Corundum | — | — | — | — | — | — | — | — | — | — |
| Thermal expansion coefficient, 1/° C. (× $10^{-7}$) at 25–1000° C.) | 16.0 | 11.5 | 10.6 | 9.0 | 9.3 | 9.7 | 12.0 | 15.8 | 12.7 | 10.5 |
| Temperature difference durable to rapid heating and quenching, °C. | 650 | 750 | 750 | 850 | 850 | 800 | 700 | 650 | 750 | 800 |
| Fusing Temperature, °C. | 1465 | 1465 | 1460 | 1460 | 1460 | 1460 | 1465 | 1465 | 1460 | 1465 |
| Total pore volume, $cm^3/g$ | 0.26 | 0.24 | 0.23 | 0.22 | 0.22 | 0.20 | **** | **** | 0.33 | 0.34 |
| Mean pore size, μ | 2.0 | 4.7 | 8.2 | 18 | 28 | 40 | **** | **** | 11 | 25 |

| | Present Invention | | | | | | Reference | | | |
|---|---|---|---|---|---|---|---|---|---|---|
| | 11 | 12 | 13 | 14 | 15 | 16 | 1* | 2** | 3* | 4*** |
| Chemical composition (wt. %) | | | | | | | | | | |
| $SiO_2$ | 49.5 | 49.5 | 49.5 | 48.0 | 42.5 | 45.0 | 51.0 | 51.0 | 49.5 | 45.0 |
| $Al_2O_3$ | 35.5 | 35.5 | 35.5 | 37.5 | 43.5 | 39.5 | 35.5 | 35.5 | 35.5 | 46.0 |
| MgO | 15.0 | 15.0 | 15.0 | 14.5 | 14.0 | 15.5 | 13.5 | 13.5 | 15.0 | 9.0 |
| compounding recipe, wt. % (Average particle size, μ) | | | | | | | | | | |
| Talc | 9 (34) | — | 20 (27) | 39 (27) | 19 (27) | 23 (34) | 40 (2.8) | 40 (200) | — | 28 (34) |
| Calcined talc | — | 38 (26) | 20 (30) | — | 20 (30) | 20 (30) | — | — | — | — |
| Magnesium hydroxide | — | — | — | — | — | — | — | — | 18 (2.1) | — |
| Magnesium carbonate | — | — | — | — | — | — | — | — | — | — |
| Magnesium oxide | 12 (5.5) | — | — | — | — | — | — | — | — | — |
| Aluminum hydroxide | — | 26 (0.5) | — | 20 (0.5) | 15 (0.5) | 15 (0.5) | — | — | 41 (0.5) | — |
| Aluminum oxide | — | — | 16 (3.0) | 6 (3.0) | 18 (3.0) | 15 (3.0) | 14 (3.0) | 14 (3.0) | — | 22 (3.0) |
| Kaolin | 20 (1.5) | 19 (1.5) | 15 (1.5) | 35 (1.5) | 10 (1.5) | 10 (1.5) | 15 (1.5) | 15 (1.5) | — | 60 (1.5) |
| Calcined kaolin | 59 (5.1) | 17 (5.1) | 29 (5.1) | — | 18 (5.1) | 17 (5.1) | 31 (5.1) | 31 (5.1) | — | — |
| Amorphous silica | — | — | — | — | — | — | — | — | 41 (0.7) | — |
| Firing condition | | | | | | | | | | |

TABLE 1-continued

| | | | | | | | | | | |
|---|---|---|---|---|---|---|---|---|---|---|
| Temperature rising rate above 1100° C. °C./hr | 50 | 30 | 70 | 100 | 70 | 50 | 200 | 200 | 200 | 70 |
| Firing temperature × Retention time, °C. hr | 1380 × 5 | 1380 × 5 | 1360 × 5 | 1400 × 5 | 1410 × 5 | 1370 × 5 | 1380 × 5 | 1380 × 5 | 1380 × 5 | 1400 × 5 |
| Properties of cordierite ceramic | | | | | | | | | | |
| Content of crystal phase (wt. %) | | | | | | | | | | |
| Spinel | 1.5 | 2 | 2.5 | 3 | 14 | 10 | 2 | 2 | 3 | — |
| Sapphirine | 1 | 1 | — | 1 | 3 | 1 | 2.5 | 0.5 | 1 | — |
| Mullite | 1.5 | 1 | 1 | 2 | 3 | 1 | 0.5 | 1 | 2 | 30 |
| Corundum | — | — | — | — | 1 | — | — | — | — | 5 |
| Thermal expansion coefficient, 1/° C. (× 10$^{-7}$) at 25-1000° C.) | 10.0 | 9.0 | 12.0 | 12.0 | 16.0 | 11.5 | 19.6 | 18.8 | 20.1 | 25.0 |
| Temperature difference durable to rapid heating and quenching, °C. | 850 | 800 | 750 | 800 | 650 | 800 | 550 | 550 | 500 | 450 |
| Fusing Temperature, °C. | 1470 | 1465 | 1465 | 1480 | 1500 | 1490 | 1465 | 1470 | 1475 | 1570 |
| Total pore volume, cm$^3$/g | 0.24 | 0.20 | 0.22 | 0.19 | 0.26 | 0.23 | 0.28 | **** | 0.36 | 0.26 |
| Mean pore size, μ | 15 | 12 | 6 | 12 | 8 | 5 | 1.2 | **** | 1.5 | 13 |

(Note)
*Since the average particle size of talc or magnesium hydroxide as the magnesia raw material is less than 5 microns, the thermal expansion coefficient over the range of 25-1000° C. exceeds 16 × 10$^{-7}$ (1/° C.) and the thermal shock resistance is poor. Further, since the mean poor size is less than 2 microns, the adhering ability of the active material for catalyst and the catalytic component and the resistance to catalyst poison are also poor.
**Since the average particle size of talc as the magnesia raw material is more than 150 microns, the thermal expansion coefficient over the range of 25-1000° C. exceeds 16 × 10$^{-7}$ (1/° C.) and the thermal shock resistance is poor.
***Since the chemical composition is beyond the range of 42-52% by weight of silica, 34-48% by weight of alumina and 10-18% by weight of magnesia, the thermal expansion coefficient over the range of 25-1000° C. exceeds 16 × 10$^{-7}$ (1/° C.) and the thermal shock resistance is poor.
****The exact data could not be obtained because the honeycomb contains a large number of pores having a pore diameter of more than 100μ which is a limit for measurement according to the mercury pressure porosimeter.

As seen from the results in Table 1 and FIGS. 1 and 3, when the average particle size of the magnesia raw material is limited to the range of 5-150 microns, the thermal expansion coefficient over the range of 25°-1000° C. is not more than 16×10$^{-7}$ (1/°C.) and the temperature difference durable to rapid heating and quenching is higher than 650° C., so that the thermal shock resistance is practically satisfied. Furthermore, as seen from FIG. 2, when the average particle size of the magnesia raw material is limited to the range of 5-150 microns, the resulting low-expansive and porous cordierite ceramic has a mean pore size of 2-50 microns, so that not only the adhering ability of the active material for catalyst and the catalytic component on the honeycomb catalyst substrate is excellent, but also the initial purifying efficiency for exhaust gas and the resistance to catalyst poison with a chemical substance such as lead, phosphorus and the like are improved.

Moreover, as seen from the data of Table 1, the ceramic honeycomb consisting mainly of cordierite in crystal phase and containing not more than 35% by weight of at least one crystal selected from spinel, sapphirine, mullite and corundum have the practically satisfactory thermal resistance because the fusing temperature is higher than 1460° C.

As mentioned above, the cordierite ceramic according to the present invention has a thermal expansion coefficient of not more than 16×10$^{-7}$ (1/°C.) over the range of 25°-1000° C. and a mean pore size of 2-50 microns by limiting the average particle size of the magnesia raw material such as talc, calcined talc, magnesium carbonate, magnesium hydroxide, magnesium oxide and the like to the range of 5-150 microns, so that the thermal shock resistance, the adhering ability and the purifying efficiency for exhaust gas are excellent. Accordingly, the cordierite ceramic according to the present invention can be broadly used for various industrial catalyst substrates and various refractories as well as the catalyst substrate for purifying the automotive exhaust gas and is very commercially useful.

What is claimed is:

1. A process for the preparation of cordierite ceramic consisting mainly of cordierite in crystal phase after fired, and having a mean pore size of 2-50 microns and a thermal expansion coefficient of not more than 16×10$^{-7}$ (1/°C.) in the range of 25°-1000° C., characterized in that a starting material having a chemical composition consisting of 42-52% by weight of silica, 34-48% by weight of alumina and 10-18% by weight of magnesia, in which an average particle size of magnesia starting material is 5-150 microns, is fired by raising temperature at a rate of 30°-300° C./hr in the temperatures above 1100° to control formation of a liquid phase appearing during firing and then keeping a peak temperature for sufficient time to attain crystallization of cordierite from the liquid phase.

2. A process as claimed in claim 1, wherein said magnesia starting material is at least one of talc, calcined talc, magnesite, calcined magnesite, brucite, magnesium carbonate, magnesium hydroxide and magnesium oxide.

3. A process as claimed in claim 1, wherein said average particle size of the magnesia starting material is within a range of 21-50 microns.

4. A process as claimed in claim 2, wherein said average particle size of the magnesia starting material is within a range of 26-50 microns.

5. A process as claimed in claim 1, wherein said chemical composition consists of 44-51% by weight of silica, 34-45% by weight of alumina and 11-15% by weight of magnesia.

* * * * *